United States Patent
Netsu et al.

(10) Patent No.: US 8,793,853 B2
(45) Date of Patent: Aug. 5, 2014

(54) CORE WIRE HOLDER FOR PRODUCING POLYCRYSTALLINE SILICON AND METHOD FOR PRODUCING POLYCRYSTALLINE SILICON

(75) Inventors: Shigeyoshi Netsu, Joetsu (JP); Shinichi Kurotani, Joetsu (JP); Kyoji Oguro, Joetsu (JP); Fumitaka Kume, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 37 days.

(21) Appl. No.: 13/502,015

(22) PCT Filed: Jul. 27, 2010

(86) PCT No.: PCT/JP2010/004773
§ 371 (c)(1),
(2), (4) Date: Apr. 13, 2012

(87) PCT Pub. No.: WO2011/045881
PCT Pub. Date: Apr. 21, 2011

(65) Prior Publication Data
US 2012/0201976 A1    Aug. 9, 2012

(30) Foreign Application Priority Data
Oct. 14, 2009    (JP) .................................. 2009-237017

(51) Int. Cl.
*B25B 1/00*    (2006.01)

(52) U.S. Cl.
USPC .......................................... 29/281.1; 29/244

(58) Field of Classification Search
USPC ...................... 269/903, 900, 21, 20; 29/281.1
See application file for complete search history.

(56) References Cited

U.S. PATENT DOCUMENTS

| | | | |
|---|---|---|---|
| 6,672,577 B2 * | 1/2004 | Murvine | 269/45 |
| 7,939,153 B2 * | 5/2011 | Lenkl | 428/43 |

(Continued)

FOREIGN PATENT DOCUMENTS

CN    101538042 A    9/2009

(Continued)

OTHER PUBLICATIONS

Combined Chinese Office Action and Search Report issued Sep. 5, 2013 in Patent Application No. 201080046255.1 (with English Translation of Category of Cited Documents).
International Search Report issued on Nov. 2, 2010 in PCT/JP10/04773 filed on Jul. 27, 2010.

*Primary Examiner* — Lee D Wilson
(74) *Attorney, Agent, or Firm* — Oblon, Spivak, McClelland, Maier & Neustadt, L.L.P.

(57) ABSTRACT

One end side of a core wire holder 20 is formed into a shape of a truncated cone and has an inclined surface. In the end portion, an opening 22 is provided, and a hollow portion 21 is formed, a silicon core wire 5 being inserted into the hollow portion 21 and held therein. On the surface of the silicon core wire 5, polycrystalline silicon 6 is vapor deposited by the Siemens method to produce a polycrystalline silicon rod. On the inclined surface of the truncated cone portion in the vicinity of the opening 22, as a thermal insulating layer, annular slits 23a to 23c are formed from an outer circumferential surface in the vicinity of the opening toward the hollow portion 21. The annular slit acts as a thermal insulating portion, and suppresses escape of the heat to heat the one end side of the core wire holder 20.

17 Claims, 4 Drawing Sheets

(56) References Cited

U.S. PATENT DOCUMENTS

| | | | |
|---|---|---|---|
| 8,276,897 B2 * | 10/2012 | Schneider | 269/71 |
| 2002/0088401 A1 | 7/2002 | Hertlein et al. | |
| 2003/0094744 A1 * | 5/2003 | scott | 269/289 R |
| 2009/0238992 A1 * | 9/2009 | Endoh et al. | 427/543 |
| 2012/0201976 A1 * | 8/2012 | Netsu et al. | 427/585 |

FOREIGN PATENT DOCUMENTS

| | | |
|---|---|---|
| JP | 37 18861 | 1/1961 |
| JP | 50 85586 | 7/1975 |
| JP | 2002 234720 | 8/2002 |
| JP | 2002 338226 | 11/2002 |
| JP | 2009 256191 | 11/2009 |

* cited by examiner

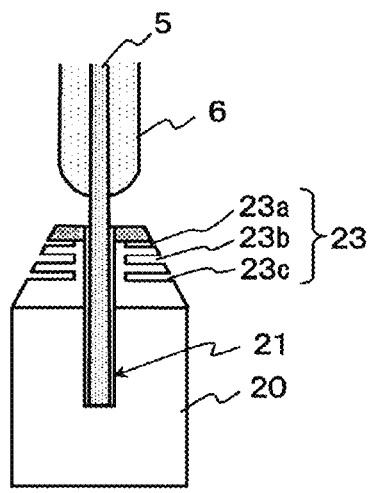 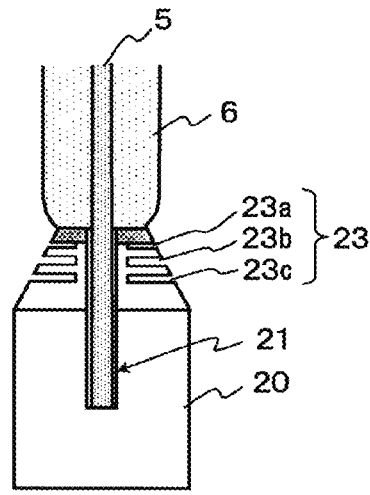 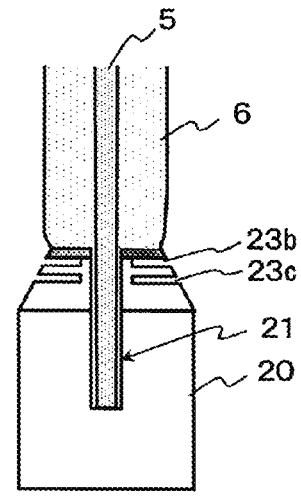
FIG.3A    FIG.3B    FIG.3C
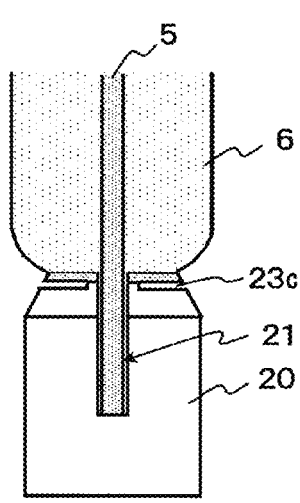 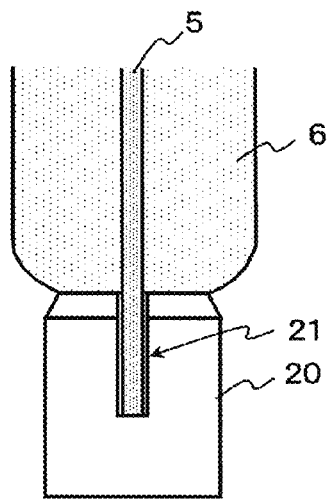
FIG.3D    FIG.3E

CORE WIRE HOLDER FOR PRODUCING POLYCRYSTALLINE SILICON AND METHOD FOR PRODUCING POLYCRYSTALLINE SILICON

CROSS REFERENCE TO RELATED APPLICATIONS

This application is a 371 of International Patent Application No. PCT/JP10/004773, filed on Jul. 27, 2010, and claims priority to Japanese Patent Application No. 2009-237017, filed on Oct. 14, 2009.

TECHNICAL FIELD

The present invention relates to a core wire holder used for production of polycrystalline silicon and a method for producing polycrystalline silicon.

BACKGROUND ART

Siemens method is known as a method for producing polycrystalline silicon used as a raw material for single-crystal silicon used for production of semiconductors and silicon used for production of solar cells. The Siemens method is a method in which a raw material gas containing chlorosilane is contacted with a heated silicon core wire, and polycrystalline silicon is vapor deposited on the surface of the silicon core wire by a CVD (Chemical Vapor Deposition) method.

When polycrystalline silicon is vapor deposited by the Siemens method, two silicon core wires in the vertical direction and one silicon core wire in the horizontal direction are assembled into a Π-shape (approximately inverted U-shaped) within a reactor of a vapor deposition apparatus, and both ends of the Π-shaped silicon core wire are fixed through a pair of core wire holders to a pair of metal electrodes disposed on a baseplate. The configuration is disclosed in Japanese Patent Publication No. 37-18861 (Patent Literature 1), for example.

Each of the metal electrodes penetrates through the baseplate and an insulator is sandwiched by the metal electrode and the baseplate. The metal electrode is connected to another metal electrode via a wire or to a power supply provided outside the reactor. In order to prevent deposition of polycrystalline silicon during vapor deposition, the metal electrode, the baseplate, and the reactor are cooled using a coolant. The core wire holder fixed to the metal electrode is also cooled by the metal electrode.

While a current is conducted from the metal electrode to heat the silicon core wire in a hydrogen atmosphere to a temperature in the range of not less than 900° C. and not more than 1200° C., a raw material gas such as a mixed gas of trichlorosilane and hydrogen is fed from a gas nozzle into the reactor. Thereby, silicon is vapor deposited on the silicon core wire to form a polycrystalline silicon rod having a desired diameter in a Π-shape.

Unfortunately, during or after such a step of vapor depositing polycrystalline silicon, the polycrystalline silicon rod may be inclined or toppled.

As measures to prevent such inclination or toppling, for example, Japanese Patent Laid-Open No. 2002-234720 (Patent Literature 2) proposes use of a core wire holder having a thermal conductivity more than 145 W/m·K and a coefficient of thermal expansion suitable for that of silicon.

CITATION LIST

Patent Literature

Patent Literature 1: Japanese Patent Publication No. 37-18861

Patent Literature 2: Japanese Patent Laid-Open No. 2002-234720

SUMMARY OF INVENTION

Technical Problem

In the case where polycrystalline silicon is vapor deposited by the Siemens method, for improvement in productivity, a large flow rate or high concentration of the raw material gas is desirably fed from the initial stage of growth to accelerate the growth rate. If a large flow rate or high concentration of the raw material gas is fed at the initial stage of growth, however, the silicon core wire is likely to be inclined or toppled.

The silicon core wire is inclined or toppled at a stage where joint strength of the silicon core wire and the core wire holder is insufficient. It is thought that the inclination or toppling is attributed to uneven growth of polycrystalline silicon on the silicon core wire in the vicinity of the joint portion of the silicon core wire and the core wire holder at the initial stage of growth of polycrystalline silicon.

The core wire holder is usually made of graphite. One end side (first end side) of the core wire holder has a hollow portion, the silicon core wire being inserted into the hollow portion and held therein. The other end side (second end side) of the core wire holder is fixed to the metal electrode. The current fed from the metal electrode to the second end side of the core wire holder flows to the end of the first end side of the core wire holder having low resistance, and then flows into the silicon core wire in the vicinity of the opening of the hollow portion for the first time.

The silicon core wire usually has a rectangular cross section. The silicon core wire is inserted into the hollow portion having a rectangular cross section and formed in the core wire holder, and closely contacts two adjacent surfaces in the rectangular cross section of the hollow portion. The current flows from the core wire holder into the core wire at the closely contacting two surfaces in the vicinity of the opening of the hollow portion. The current flows in the core wire upwardly in a shortest distance. For this reason, more heat is generated on the side of the closely contacting two surfaces than on the side of the non-contacting two surfaces.

As a result, at the initial stage of the reaction, deposition of polycrystalline silicon is accelerated on the side of the contacting surfaces of the core wire holder. On the other hand, in a portion of the hollow portion in which the silicon core wire does not contact the core wire holder (on the side of the non-contacting surfaces of the core wire holder), the surface temperature of the core is low and the rate of polycrystalline silicon to be deposited is low. For this reason, the shape of polycrystalline silicon becomes uneven.

Moreover, at the initial stage of the reaction, irrespective of whether the shape of the cross section of the core wire is rectangular or circular, the temperature in the vicinity of the portion of the silicon core wire contacting the core wire holder is lower than that of a main body of polycrystalline silicon because the metal electrode contacting the core wire holder is cooled by water. For this reason, the polycrystalline silicon in the portion of the silicon core wire contacting the core wire holder has a lower rate of deposition and a smaller diameter than those in the main body.

Thus, if the flow rate or concentration of the raw material gas is greatly increased in the state where the shape of polycrystalline silicon in the vicinity of the joint portion of the silicon core wire and the core wire holder is uneven and the diameter thereof is small, the silicon core wire oscillates and the moment concentrates on the joint portion. As a result, inclination or toppling by damages is likely to occur. Moreover, if the flow rate or concentration of the raw material gas is increased, the current is also rapidly increased because it is necessary to supply an amount of the heat equivalent to convective heat transfer of the raw material gas in order to keep the temperature of the silicon core wire. For this reason, the current density is increased in the portion of the silicon core wire where the shape is uneven and the diameter is small, and silicon is partially fused or fusion cut, causing the silicon core wire to be inclined or toppled.

For such a reason, in the related art, in vapor deposition of polycrystalline silicon, the flow rate and concentration of the raw material gas need to be restricted until polycrystalline silicon is deposited in the entire opening of the hollow portion to obtain sufficient strength in the joint portion of the silicon core wire and the core wire holder. Additionally, the growth rate is undesirably suppressed until the sufficient strength is obtained.

The present invention has been made in order to solve the problems above, and an object of the present invention is to provide a method for producing polycrystalline silicon with which sufficient joint strength of a silicon core wire and a core wire holder can be obtained in a short time, and as a result, a period of time to suppress a growth rate at an initial stage of a reaction can be shortened.

Solution to Problem

In order to solve the problems above, a core wire holder according to the present invention is a core wire holder used for production of polycrystalline silicon by Siemens method, the core wire holder including: a thermal insulating portion provided between one end and the other end of the core wire holder, wherein an opening of a hollow portion into which a silicon core wire is inserted is provided in the one end, and the other end is a contact portion with a metal electrode for flowing a current to the silicon core wire.

The core wire holder is a carbon electrode made of graphite, for example.

According to an embodiment, the thermal insulating portion can include at least one annular slit formed from an outer circumferential surface in the vicinity of the opening toward the hollow portion.

The depth of the annular slit to be formed is preferably not less than 70% and less than 100% and more preferably not less than 90% and less than 100% of a thickness of the core wire holder in a region in which the annular slit is formed.

Preferably, a distance between an inner circumferential surface of the annular slit and an outer circumferential surface of the silicon core wire is not less than 0.1 mm, and a width of the annular slit is not less than 0.5 mm.

In the core wire holder according to the present invention, for example, the one end side is formed into a shape of a truncated cone, and the annular slit is formed on an inclined surface of the truncated cone.

According to an embodiment of the core wire holder according to the present invention, the annular slit may be filled with an insulating material having a thermal conductivity smaller than that of a material for the core wire holder.

Preferably, a thermal conductivity of the core wire holder according to the present invention is not more than 145 W/m·K.

A method for producing polycrystalline silicon according to the present invention is a method for producing polycrystalline silicon using the core wire holder, the method comprising: supplying a current to the core wire holder such that a current density in a cross section of the annular slit forming portion is not less than 0.05 A/mm$^2$ and not more than 4.9 A/mm$^2$ when vapor deposition of polycrystalline silicon is started.

During the step of vapor depositing polycrystalline silicon, the one end side of the core wire holder receives the conduction heat and radiation heat from the silicon core wire or polycrystalline silicon. In the conventional core wire holder, the heat undesirably escapes to the metal electrode through the other end side of the core wire holder cooled by the metal electrode. As a result, the one end side is insufficiently heated to reduce the deposition rate of polycrystalline silicon on the one end side.

Contrary to this, in the core wire holder according to the present invention, the thermal insulating portion is provided between the one end (upper side) and the other end (lower side), wherein the opening of the hollow portion into which the silicon core wire is inserted is provided in the one end, and the other end is a contact portion with the metal electrode for flowing the current to the silicon core wire. Thereby, the conduction heat and radiation heat from the silicon core wire or polycrystalline silicon are difficult to escape to the metal electrode side, and the one end side is uniformly heated by the heat accumulated between the one end side of the core wire holder and the thermal insulating portion.

As a result, the one end side of the core wire holder (upper surface side) is kept at a high temperature and the temperature distribution on the one end side becomes even. The efficiency of deposition of polycrystalline silicon on the silicon core wire in the vicinity of the upper surface of the core wire holder is higher, and polycrystalline silicon is uniformly deposited in the vicinity of the upper surface of the core wire holder.

Moreover, at the initial stage of the reaction, a sufficiently large area of the upper surface of the core wire holder covered with polycrystalline silicon can be obtained. For this reason, sufficient joint strength of the silicon core wire and the core wire holder can be obtained in a short time, and a period of time to suppress a growth rate at the initial stage of the reaction can be shortened.

BRIEF DESCRIPTION OF DRAWINGS

FIG. 3 is a conceptual view showing a state where a core wire holder is heated when polycrystalline silicon is deposited in the vicinity of a first end of a core wire holder.

DESCRIPTION OF EMBODIMENTS

Hereinafter, with reference to the drawings, an embodiment according to the present invention will be described.

Figure 1:
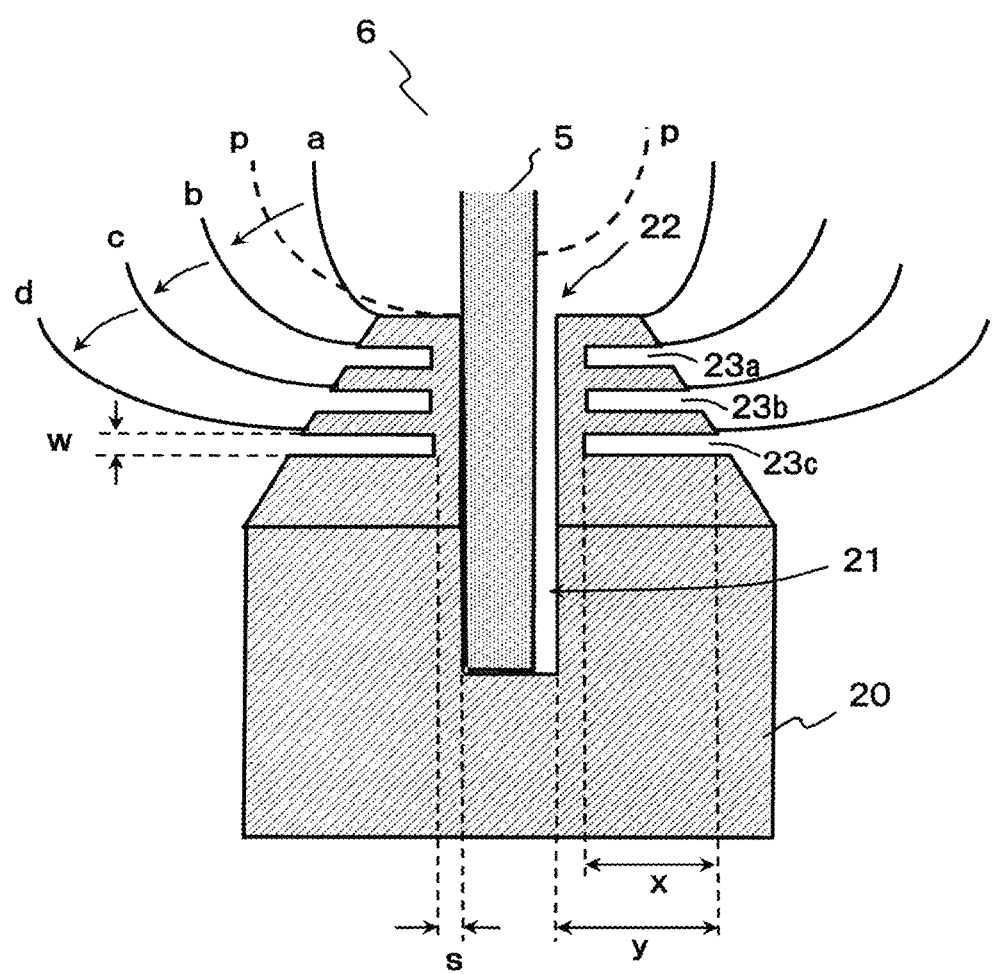
FIG. 1 is a cross-sectional schematic view showing an example of a configuration of a core wire holder according to the present invention.

FIG. 1 is a cross-sectional schematic view showing an example of a configuration of a core wire holder according to the present invention. A core wire holder 20 according to the present invention can be a carbon electrode made of graphite, for example. In the example shown in the drawing, one end side (first end side) is formed into a shape of a truncated cone and has an inclined surface in the truncated cone portion. In the end portion, an opening 22 is provided, and a hollow portion 21 is formed, a silicon core wire 5 being inserted into the hollow portion 21 and held therein.

On the surface of the silicon core wire 5, polycrystalline silicon 6 is vapor deposited by the Siemens method to produce a polycrystalline silicon rod. As described later, the other end side of the core wire holder 20 (second end side) is a contact portion with a metal electrode for flowing a current to the silicon core wire 5 (shown by reference numeral 2 in FIG. 2). The core wire holder 20 is fixed to the metal electrode 2.

On the inclined surface of the truncated cone portion in the vicinity of the opening 22, annular slits 23 (23a to 23c) are formed as a thermal insulating layer from the outer circumferential surface in the vicinity of the opening toward the hollow portion 21. The annular slit 23 acts as a thermal insulating portion (thermal insulating layer) to suppress escape of the conduction heat and radiation heat from the silicon core wire 5 or the polycrystalline silicon 6 to the metal electrode. The slit as the thermal insulating portion as shown having annular cut portions is easy to produce and use. An alternative shape can be used: for example, the side surface of the core wire holder is cut straight from an opposite position of the side surface to form two approximately semicircular slits with the bisector of the circular cross section of the core wire holder being sandwiched by the two approximately semicircular slits.

For example, in the case where the core wire holder 20 is a carbon electrode made of graphite, the groove (gap) of the annular slit 23 effectively acts as the thermal insulating layer. However, when the polycrystalline silicon 6 is deposited in the core wire holder 20 and filled into the groove of the annular slit 23, the annular slit 23 no longer acts as the thermal insulating layer. Accordingly, in the case where a longer period of time to heat the first end side is desired, a plurality of the annular slits 23 may be formed as shown in FIG. 1.

In the conventional core wire holder having no thermal insulating portion (thermal insulating layer), the conduction heat and radiation heat from the silicon core wire or the polycrystalline silicon received by the one end side during the vapor deposition step of polycrystalline silicon escape to the metal electrode through the other end side of the core wire holder cooled by the metal electrode. Accordingly, the one end side is insufficiently heated, resulting in a low deposition rate of polycrystalline silicon on the one end side. Moreover, in the portion in which the silicon core wire does not contact the core wire holder in the hollow portion 21 (non-contact portion), the temperature is low, and the rate of deposition is low at the initial stage of growth of polycrystalline silicon. As a result, the shape of the polycrystalline silicon 6 on the upper end side (one end side) of the core wire holder at the initial stage of deposition is as shown by a dashed line p in FIG. 1. The silicon core wire 5 has a small contact area with the upper end surface of the core wire holder, leading to difficulties to ensure the sufficient joint strength of the silicon core wire 5 and the core wire holder.

Contrary to this, in the case where the annular slit 23 is provided in the core wire holder 20 as in the present invention, the conduction heat and radiation heat from the silicon core wire 5 or the polycrystalline silicon 6 are difficult to escape to the metal electrode 2 side. For this reason, the one end side is uniformly heated by the heat accumulated between the one end side and the thermal insulating portion in the core wire holder 20.

Additionally, because the current cannot flow through the portion where the groove of the annular slit 23 is formed, the current flows through the inside of the core wire holder 20 mainly on the hollow portion side to increase the current density in the hollow portion. Particularly, if the one end side of the core wire holder 20 is formed into a shape of a truncated cone as shown in FIG. 1 and the annular slit 23 is formed on the inclined surface of the truncated cone, the current is likely to flow mainly through the hollow portion side. Namely, such an annular slit 23 restricts the flow path of the current and increases the amount of the heat applied to the one end side.

For this reason, the one end side (upper surface side) of the core wire holder 20 is easily kept at a high temperature and the temperature distribution on the one end side is even. The efficiency of deposition of the polycrystalline silicon 6 on the silicon core wire in the vicinity of the upper surface of the core wire holder 20 is increased and the polycrystalline silicon 6 is uniformly deposited on the silicon core wire in the vicinity of the upper surface of the core wire holder 20. As a result, as shown by a solid line a in FIG. 1, the shape of the core wire holder 20 on the upper end side (one end side) at the initial stage of deposition of the polycrystalline silicon 6 has a large contact area with the upper end surface of the core wire holder 20. Thereby, sufficient joint strength of the silicon core wire 5 and the core wire holder 20 can be obtained in a short time, and the period of time to suppress the growth rate at the initial stage of the reaction can be shortened. Subsequently, the polycrystalline silicon 6 is grown as shown by solid lines b, c, and d.

If a deeper groove of the annular slit 23 is provided to reduce a distance from the bottom of the groove to the silicon core wire 5, thermal insulating properties are improved but mechanical strength is reduced. Conversely, if a shallower groove of the annular slit 23 is provided to increase the distance from the bottom of the groove to the silicon core wire 5, the mechanical strength is improved but the thermal insulating properties are reduced.

According to the examination by the present inventors, in order to ensure good thermal insulating properties and mechanical strength, the depth of the annular slit 23 to be formed (x) is preferably not less than 70% and less than 100% and more preferably not less than 90% and less than 100% of the thickness of the core wire holder 20 (y) in the region in which the annular slit 23 is formed.

Preferably, the distance (s) between the inner circumferential surface of the annular slit 23 and the outer circumferential surface of the silicon core wire 5 is not less than 0.1 mm. Further, if the width of the annular slit 23 (w) is less than 0.5 mm, a spark may occur between the slits. Accordingly, the width of the annular slit 23 (w) is preferably not less than 0.5 mm.

When the polycrystalline silicon 6 is vapor deposited on the silicon core wire 5 by the Siemens method, a current of 60 to 70 A is supplied at the time of ignition, and after that, a current of usually approximately 100 A is supplied at the time of the start of vapor deposition. If the distance from the bottom of the groove of the annular slit 23 formed in the core wire holder 20 to the core wire 5 is 0.1 mm, the current density in the cross section of the current that flows between the annular slit 23 and the hollow portion 21 is 4.9 A/mm². If the distance from the bottom of the groove of the annular slit 23 to the core wire 5 is 50 mm, the current density in the cross section of the current that flows between the annular slit 23 and the hollow portion 21 is 0.05 A/mm².

If the distance from the bottom of the groove of the annular slit 23 to the core wire 5 is more than 50 mm, the thermal insulating effect by the annular slit 23 is substantially lost. Accordingly, in the case where the polycrystalline silicon 6 is produced using the core wire holder 20 according to the present invention, at the time of the start of vapor deposition of the polycrystalline silicon 6, the current is supplied to the core wire holder 20 such that the current density of the cross section in the annular slit forming portion is not less than 0.05 $A/mm^2$ and not more than 4.9 $A/mm^2$.

As the thermal conductivity of the core wire holder 20 itself is lower, the amount of the heat to escape to the metal electrode 2 is smaller. As a result of trial and error examination by the present inventors, it was found out that a desirable thermal conductivity of the core wire holder 20 is not more than 145 W/m·K.

Hereinafter, a step of producing polycrystalline silicon according to the present invention will be specifically described.

Figure 2:
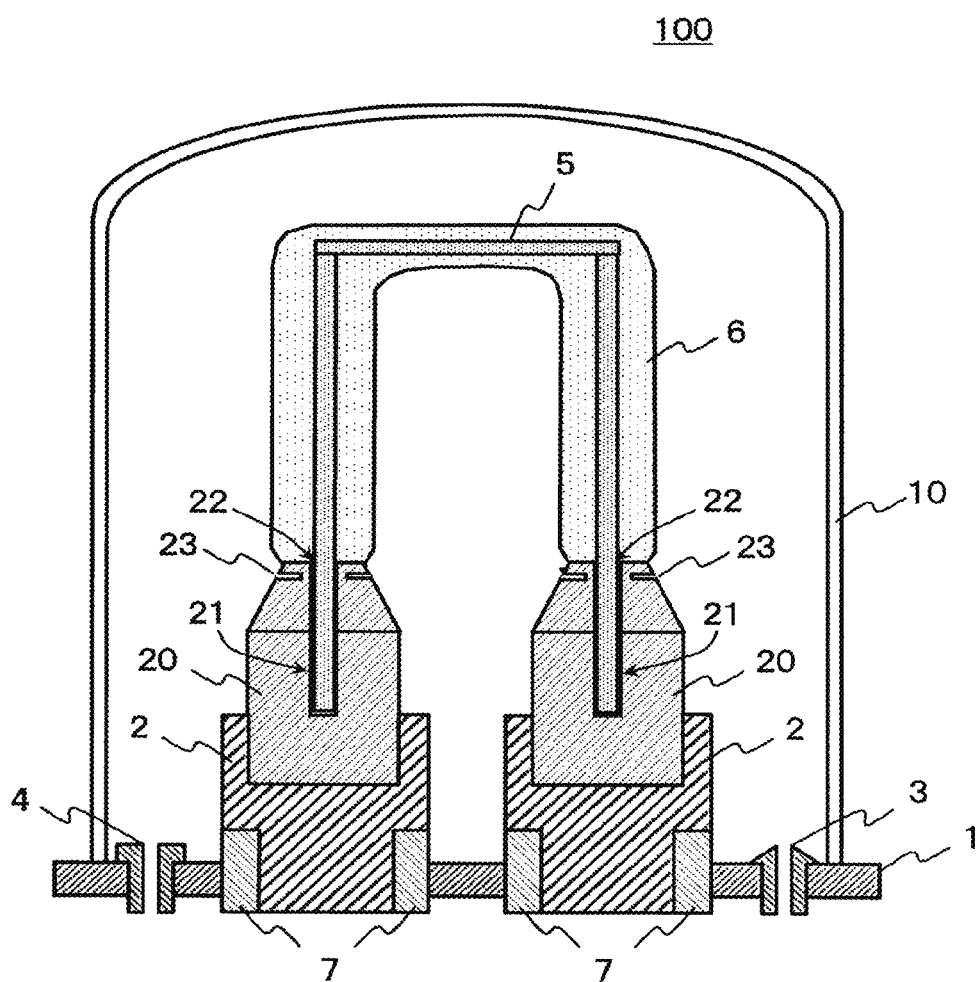
FIG. 2 is a schematic explanatory view showing an example of a vapor deposition apparatus in which the present invention is used.

FIG. 2 is a schematic explanatory view showing a vapor deposition apparatus 100 in which the present invention is used. The vapor deposition apparatus 100 is an apparatus that vapor deposits the polycrystalline silicon 6 on the surface of the silicon core wire 5 by the Siemens method, and schematically includes a baseplate 1 and a reactor 10. Here, the core wire holder 20 is a carbon electrode made of graphite.

The baseplate 1 includes the metal electrode 2 that supplies the current to the silicon core wire 5, a gas nozzle 3 that supplies a process gas such as nitrogen gas, hydrogen gas, and trichlorosilane gas, and a vent 4 from which an exhaust gas is discharged.

The metal electrode 2 penetrates through the baseplate 1 and an insulator 7 is sandwiched by the metal electrode and the baseplate. The metal electrode 2 is connected to another metal electrode via a wire or to a power supply provided in the outside of the reactor. The metal electrode 2, the baseplate 1, and the reactor 10 are cooled using a coolant.

As shown in FIG. 2, in vapor deposition of the polycrystalline silicon 6, two silicon core wires 5 in the vertical direction and one silicon core wire 5 in the horizontal direction are assembled into a Π-shape within the reactor 10, and both ends of the Π-shaped silicon core wire 5 are fixed through a pair of the core wire holders 20 to a pair of metal electrodes 2 disposed on the baseplate 1.

The core wire holder 20 is made of graphite having a thermal conductivity of not more than 145 W/m·K. On the one end side (first end side) having the inclined surface of the truncated cone portion, the hollow portion 21 is formed, the silicon core wire 5 being inserted into the hollow portion 21 and held therein. The other end side (second end side) is fixed to the metal electrode 2.

On the inclined surface of the truncated cone portion provided in the vicinity of the opening 22 of the hollow portion 21 on the first end side, the annular slit 23 is formed toward the hollow portion 21 as the thermal insulating layer. Preferably, the depth of the annular slit 23 to be formed is not less than 90% and less than 100% of the thickness of the annular slit forming region, and the width of the annular slit 23 is not less than 0.5 mm. The distance from the bottom of the annular slit 23 to the core wire 5 is preferably not less than 0.1 mm. FIG. 2 shows only one annular slit 23. A plurality of annular slits may be provided.

To vapor deposit the polycrystalline silicon 6, first, the reactor 10 is closely placed on the baseplate 1, and nitrogen gas is fed from the gas nozzle 3 to replace the air within the reactor 10 with nitrogen. The air and nitrogen within the reactor 10 is discharged from the vent 4. After replacement of the air within the reactor 10 with a nitrogen atmosphere is completed, hydrogen gas is fed from the gas nozzle 3 instead of nitrogen gas to provide a hydrogen atmosphere within the reactor 10.

Next, using a heater not shown, the silicon core wire 5 is preheated to the temperature of not less than 250° C. to provide the conductivity such that the current efficiently flows in the silicon core wire 5. Subsequently, the current is supplied from the metal electrode 2 through the core wire holder 20 to the silicon core wire 5 to heat the silicon core wire 5 to the temperature of not less than 900° C. Then, while the current of approximately 100 A is supplied, hydrogen gas and trichlorosilane gas as the raw material gas are fed in a low flow rate to start vapor deposition. At this time, the current flowing between the annular slit 23 formed in the graphite core wire holder 20 and the hollow portion 21 has a current density in the cross section of not less than 0.05 $A/mm^2$ and not more than 4.9 $A/mm^2$.

FIGS. 3A to 3E are conceptual views showing a state where the core wire holder 20 is heated when the polycrystalline silicon 6 is deposited in the vicinity of the first end of the core wire holder 20.

When the silicon core wire 5 is electrically conducted to start vapor deposition of the polycrystalline silicon 6, the portion of the core wire holder 20 between the first end and the annular slit 23 receives the conduction heat and radiation heat from the silicon core wire 5 and the polycrystalline silicon 6, and gradually becomes reddish. For example, in the case where three annular slits in total (23a, 23b, and 23c) are formed as in the core wire holder 20 shown in FIG. 3A, the portion of the core wire holder 20 between the first end and the annular slit 23 is uniformly heated.

As the diameter of the polycrystalline silicon 6 is increased, the polycrystalline silicon 6 starts to be deposited on the core wire holder 20. At this time, because the portion of the core wire holder 20 between the first end and the annular slit 23a is uniformly heated, the polycrystalline silicon 6 is uniformly grown on the portion (FIG. 3B).

When the growth further progresses and the annular slit 23a is covered with the polycrystalline silicon 6, the upper portion of the annular slit 23b is heated (FIG. 3C). When the annular slit 23b is covered with the polycrystalline silicon 6, the upper portion of the annular slit 23c is heated (FIG. 3D). When the annular slit 23c is covered with the polycrystalline silicon 6, the thermal insulating effect by the annular slit 23 is lost (FIG. 3E), but the polycrystalline silicon 6 is uniformly deposited on the core wire holder and a sufficient contact area is already obtained. Accordingly, the polycrystalline silicon 6 is prevented from being fused by partial increase in the current density caused by increase in the current value.

Sufficient joint strength of the silicon core wire 5 and the core wire holder 20 is obtained when the diameter of the polycrystalline silicon 6 reaches 35 mm. Accordingly, the flow rate of the raw material gas to be fed can be increased. Then, while the amount of the raw material gas of hydrogen gas and trichlorosilane gas to be fed and the amount of the current to be fed are further increased, the polycrystalline silicon 6 is vapor deposited on the silicon core wire 5 in the range of the temperature of not less than 900° C. and not more than 1200° C. The non-reacted gas and the by-product gas are discharged from the vent 4.

After the polycrystalline silicon 6 has grown to have a desired diameter (for example, 120 mm), feed of the raw material gas is stopped, and the temperature within the reactor 10 is reduced. The atmosphere within the reactor 10 is replaced from hydrogen to nitrogen, and the reactor 10 is opened to the air.

While an embodiment in which the annular slit 23 acts as the thermal insulating layer has been described, the action as the thermal insulating layer can be obtained according to other embodiments. For example, as one embodiment, the annular slit may be filled with a material that is an insulating material and has a thermal conductivity smaller than that of the core wire holder 20.

Figure 4:
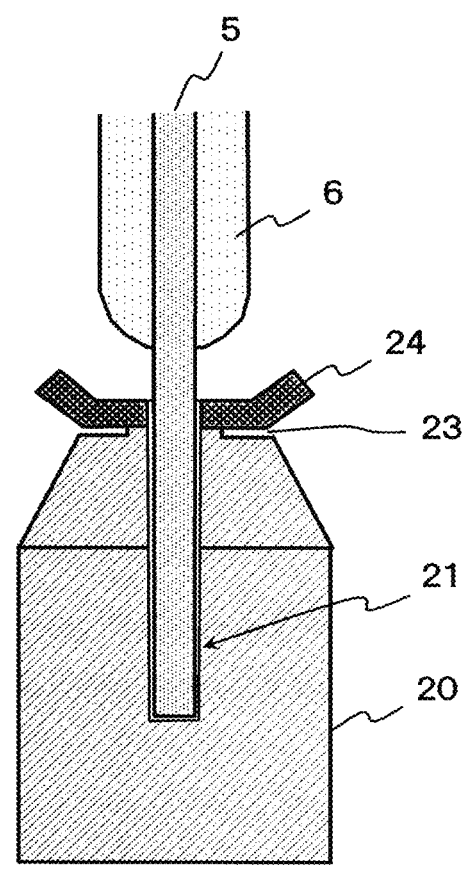
FIG. 4 is a schematic explanatory view showing other embodiment according to the present invention.

Alternatively, as shown in FIG. 4, according to an embodiment in which an enlarged inclined portion (a portion in which the diameter is enlarged or an inclined side surface is provided) 24 in the core wire holder is provided in the first end of the core wire holder 20, in addition to the heat transfer from the silicon core wire 5 and polycrystalline silicon 6, the radiation heat can be received more efficiently. Thereby, the amount of the heat applied to the first end side of the core wire holder 20 can be increased.

EXAMPLES

Example 1

A graphite core wire holder 20 having one annular slit 23 was used, in which the annular slit 23 with a width of 1 mm and a depth of 3.5 mm was formed toward the hollow portion 21 in a position 4 mm away from the opening 22 of the hollow portion 21 on the inclined surface of the truncated cone in the truncated cone first end side. While the silicon core wire 5 held by the core wire holder 20 was heated to 1063° C., hydrogen gas and trichlorosilane gas were fed as the raw material gases. The first end side of the core wire holder 20 was uniformly covered with the deposited polycrystalline silicon 6, wherein the period of time to suppress a growth rate was 28 hours after the start of vapor deposition. At that time, the diameter of the polycrystalline silicon 6 was 38 mm, and the current value was 605 A.

Example 2

Using the same type of the graphite core wire holder 20 as that in Example 1, while the silicon core wire 5 held by the core wire holder 20 was heated to 1055° C., hydrogen gas and trichlorosilane gas were fed as the raw material gases. The first end side of the core wire holder 20 was uniformly covered with the deposited polycrystalline silicon 6, wherein the period of time to suppress a growth rate was 26 hours after the start of vapor deposition. At that time, the diameter of the polycrystalline silicon 6 was 36 mm, and the current value was 590 A.

Comparative Example

Using the same type of the graphite core wire holder 20 as that in Example 1 except that no annular slit was formed, while the silicon core wire 5 held by the core wire holder 20 was heated to 1055° C., hydrogen gas and trichlorosilane gas were fed as the raw material gases. The first end side of the core wire holder 20 was uniformly covered with the deposited polycrystalline silicon 6, wherein the period of time to suppress a growth rate was 37 hours after the start of vapor deposition. At that time, the diameter of the polycrystalline silicon 6 was 56 mm, and the current value was 1110 A.

As described above, according to the present invention, polycrystalline silicon can start to be deposited in the vicinity of the first end of the core wire holder in a shorter time. Additionally, at a current value of approximately, a half of that of the core wire holder without a slit, the opening of the core wire holder can be uniformly covered with polycrystalline silicon. Moreover, the entire first end of the core wire holder 20 can be heated. Accordingly, polycrystalline silicon is uniformly deposited, and inclination or toppling attributed to partial growth of polycrystalline silicon is prevented. Further, because the polycrystalline silicon 6 is uniformly deposited in the vicinity of the first end of the core wire holder 20, sufficient joint strength of the silicon core wire 5 and the core wire holder 20 can be obtained in a short time, and the period of time to suppress the growth rate at the initial stage of a reaction can be significantly shortened.

INDUSTRIAL APPLICABILITY

According to the present invention, a method for producing polycrystalline silicon can be provided in which sufficient joint strength of the silicon core wire and the core wire holder can be obtained in a short time, and as a result, the period of time to suppress the growth rate at the initial stage of the reaction can be shortened.

REFERENCE SIGNS LIST

1 Baseplate
2 Metal electrode
3 Gas nozzle
4 Vent
5 Silicon core wire
6 Polycrystalline silicon
7 Insulator
10 Reactor
2 Core wire holder
21 Hollow portion
22 Opening
23, 23a, 23b, 23c Annular slit
24 Enlarged inclined portion of core wire holder
100 Vapor deposition apparatus

The invention claimed is:

1. A core wire holder, comprising:
a thermal insulating portion provided between one end and the other end of the core wire holder, wherein an opening of a hollow portion into which a silicon core wire can be inserted is provided in the one end, and the other end is a contact portion with a metal electrode for flowing a current to the silicon core wire, wherein the core wire holder is a carbon electrode made of graphite.

2. The core wire holder according to claim 1, wherein the thermal insulating portion comprises at least one annular slit formed from an outer circumferential surface near the opening of the hollow portion.

3. The core wire holder according to claim 2, wherein a depth of said at least one annular slit is not less than 70% and less than 100% of a thickness of the core wire holder in a region in which said at least one annular slit is formed.

4. The core wire holder according to claim 2, wherein a depth of said at least one annular slit is not less than 90% and less than 100% of a thickness of the core wire holder in a region in which said at least one annular slit is formed.

5. The core wire holder according to claim 2, wherein a distance between an inner circumferential surface of said at least one annular slit and an outer circumferential surface of the silicon core wire is not less than 0.1 mm.

6. The core wire holder according to claim 2, wherein a width of said at least one annular slit is not less than 0.5 mm.

7. The core wire holder according to claim 2, wherein the one end is formed into a shape of a truncated cone, and said at least one annular slit is formed on an inclined surface of the truncated cone.

8. The core wire holder according to claim 2, wherein said at least one annular slit is filled with an insulating material having a thermal conductivity less than that of the core wire holder.

9. The core wire holder according to claim 1, wherein a thermal conductivity of the core wire holder is not more than 145 W/m·K.

10. The core wire holder according to claim 2, wherein a thermal conductivity of the core wire holder is not more than 145 W/m·K.

11. The core wire holder according to claim 3, wherein a distance between an inner circumferential surface of said at least one annular slit and an outer circumferential surface of the silicon core wire is not less than 0.1 mm.

12. The core wire holder according to claim 4, wherein a distance between an inner circumferential surface of said at least one annular slit and an outer circumferential surface of the silicon core wire is not less than 0.1 mm.

13. The core wire holder according to claim 11, wherein a width of said at least one annular slit is not less than 0.5 mm.

14. The core wire holder according to claim 12, wherein a width of said at least one annular slit is not less than 0.5 mm.

15. The core wire holder according to claim 13, wherein the one end side is formed into a shape of a truncated cone, and said at least one annular slit is formed on an inclined surface of the truncated cone.

16. The core wire holder according to claim 14, wherein the one end side is formed into a shape of a truncated cone, and said at least one annular slit is formed on an inclined surface of the truncated cone.

17. The core wire holder according to claim 10, wherein said at least one annular slit is filled with an insulating material having a thermal conductivity less than that of the core wire holder.

* * * * *